Patented Aug. 25, 1925.

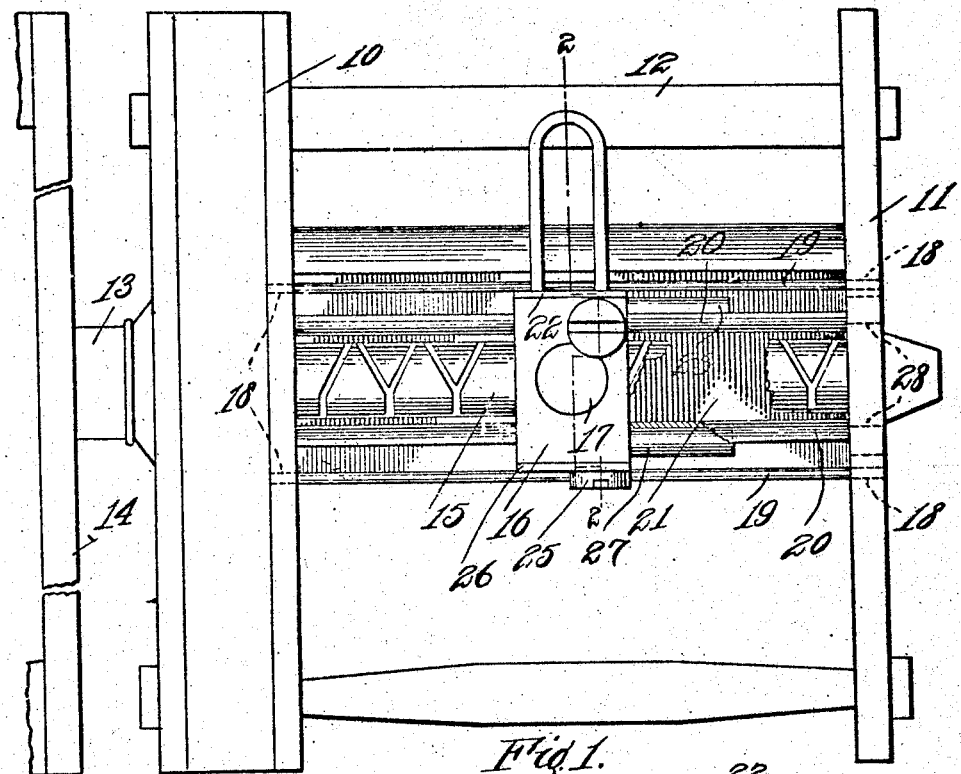

1,551,063

UNITED STATES PATENT OFFICE.

NICHOLLS J. SMITH, OF BAINBRIDGE, GEORGIA.

FISHING REEL.

Application filed April 22, 1925. Serial No. 25,085.

*To all whom it may concern:*

Be it known that I, NICHOLLS J. SMITH, a citizen of the United States, residing at Bainbridge, in the county of Decatur, State of Georgia, have invented certain new and useful Improvements in Fishing Reels; and I do hereby declare the following to be a full, clear, and exact description of the invention, such as will enable others skilled in the art to which it appertains to make and use the same.

This invention relates to new and useful improvements in fishing reels, and particularly to line guides therefor.

One object of the invention is to provide a line guide which will traverse the propelling screw shaft without danger of sticking.

Another object is to provide a line guide, and ways therefor, whereby to permit efficient lubrication to the parts, and the easy movement thereof.

Another object is to provide a line guide and the slide ways therefor, wherein the application of lubricant is rendered easy, for the purpose of securing an adequate supply for the moving parts.

Other objects and advantages will be apparent from the following description when taken in connection with the accompanying drawing.

In the drawing:

Figure 1 is an elevation of a fishing reel embodying the improved line guide and ways therefor.

Figure 2 is a vertical transverse sectional view on the line 2—2 of Figure 1, enlarged.

Figure 3 is an enlarged longitudinal sectional view through the upper portion of the guide and the way thereof.

Figure 4 is an enlarged longitudinal sectional view through the lower portion of the guide and the way thereof.

Referring particularly to the accompanying drawing, 10 and 11 represent the end disk members of the frame of the reel, which are held in proper spaced relation by the rods 12. The reel or line drum 13, is mounted in the usual manner and operable by the handle 14.

Properly journaled at its ends in the end disks 10 and 11, is the screw shaft 15, longitudinally of which the line guide block 16 is arranged to slide, said block having a pin 17 engaging in the grooves of the shaft, as clearly seen in the sectional view, Figure 2. Formed in the end disks 10 and 11, at opposite sides of the ends of the screw shaft 15, are small openings 18, and seated in these openings are the ends of the small rods 19. Secured to each of these rods 19 is the longer side portion of a semi-tubular channel 20, which extends between the end disks 10 and 11, said channels having their open sides directed outwardly away from the line drum 13. These channel members are properly secured to a plate 21, in spaced parallel relation, said plate having one of its longer edge portions curved in the direction of the adjacent channel member.

Fixed on one end of the guide block 16, and extending from said end, at right angles thereto, is a plate or flange 22, and secured to the outer end of this flange, and extending at right angles thereto, is a small tubular bar 23, said bar having one end in alinement with one side of the flange, and its other end projecting beyond the other side, said projecting end having a minute opening 24 in its lower side. This tubular bar 23 is arranged to slide within the channel 23 is arranged to slide within the channel member 20 adjacent the curved side of the plate 21. Removably secured to the other end of the block 16, by means of the screw 25, is a plate or flange 26, which also has a small tubular rod 27 secured thereto, in the same manner, and in the same position as the tube 23, this latter tubular rod or bar being arranged to slide within the other channel member 20. As clearly seen in the sectional view, Figure 2, the tubular channels 20 are so disposed that when the tubular rods 23 and 27 are disposed therewithin, such rods or bars will engage against the adjacent side walls of the channels, upon an attempt to move the guide block 16 outward radially of the reel, thus insuring the proper position of the guide block, with respect to the screw shaft and the channel members 20.

Through the opening 24, of the tubular bar 23 oil is adapted to be injected, and when said member is within its channel 20, this opening lies against the lower wall of the channel, the oil flowing at the proper rate, from this opening, into the channel, for the purpose of supplying the desired and required amount of lubricant to the parts. The other tubular rod 27 is adapted to be filled with oil saturated fabric. Each of the tubular bars 23 and 27 has a filling opening in the upper side of one end, to receive oil.

In the end disk 11, at opposite sides of the adjacent end of the screw shaft 15, there are formed the openings 28, through which the adjacent ends of the bars 23 and 27 are arranged to protrude as the guide block 16 reaches that end of the screw shaft. It will also be noted that the adjacent ends of the channels 20 are disposed in registry with said openings 28, whereby to permit the proper passage of the ends of the bars 23 and 27 through the openings 28. The manner in which the bars 23 and 27 operate in the channels 20 effectively maintain the guide block against lateral movement, or rotary movement, with respect to the screw shaft 15.

What is claimed is:

1. The combination with the end disks of a fishing reel, and the screw shaft thereof, of a line guide movable by said shaft, and a support for the guide including ways supported by the end disks, and lubricant carrying means on the block within the ways.

2. The combination with the end disks and screw shaft of a fishing reel, said end disks having openings therein, of a line guide block engaged with the shaft for driving movement by the latter, slideways between the end disks, and bars on the guide block movable in said slideways and through said openings.

3. The combination with the end disks and screw shaft of a fishing reel, of a line guide block movable on the screw shaft and having terminal lubricant carrying members, and a support for the block supported by the end disks and including channels receiving said lubricant carrying members.

4. The combination with the frame of a fishing reel and the screw shaft thereof, of a line guide block engaged with the shaft and movable thereby, channels extending between the frame ends adjacent the screw shaft, and tubular lubricant carrying members on the guide block and movable in said channels.

5. The combination with the end disks of a fishing reel, of a plate supported at its ends in the said disks, channel members carried by the plate and extending between the end disks, one of the end disks having openings registering with the adjacent ends of the channel members, a guide block movable between the end disks, and tubular lubricant carrying bars on the block slidable within the said channels and movable through said openings, each of the said bars having a lubricant distributing openings disposed in position to feed to a channel.

In testimony whereof, I affix my signature.

NICHOLLS J. SMITH.